United States Patent [19]

Lotze et al.

[11] Patent Number: 4,992,098

[45] Date of Patent: Feb. 12, 1991

[54] GLOSSY, PRECIOUS-METAL PREPARATIONS FOR MICROWAVE-RESISTANT TABLEWARE-DECORATIONS

[75] Inventors: Marion Lotze, Hammersbach; Hans Mehner, Frankfurt; Peter Kleinschmit, Hanau, all of Fed. Rep. of Germany

[73] Assignee: Degusssa Aktiengesellschaft, Frankfurt, Fed. Rep. of Germany

[21] Appl. No.: 252,932

[22] Filed: Oct. 4, 1988

[30] Foreign Application Priority Data

Oct. 29, 1987 [DE] Fed. Rep. of Germany ....... 3736583

[51] Int. Cl.$^5$ ............................................... C09D 5/30
[52] U.S. Cl. ................................... 106/123; 106/1.05; 106/1.26; 106/287.16
[58] Field of Search ................. 106/1.05, 1.26, 287.16, 106/1.23

[56] References Cited

U.S. PATENT DOCUMENTS

| | | | |
|---|---|---|---|
| 3,266,912 | 8/1966 | Murphy | 106/1 |
| 3,619,235 | 11/1971 | Furuuchi | 427/226 |
| 4,418,099 | 11/1983 | Cuevas et al. | 106/1.26 |
| 4,713,512 | 12/1987 | Wild et al. | 99/DIG. 14 |

FOREIGN PATENT DOCUMENTS 1421865  3/1971  Fed. Rep. of Germany .

Primary Examiner—Theodore Morris
Assistant Examiner—David M. Brunsman
Attorney, Agent, or Firm—Beveridge, DeGrandi & Weilacher

[57] ABSTRACT

Glossy precious-metal preparations containing of one or more organo-precious-metal compounds, an organic carrier and a fluxing agent composed of organic metal compounds are used for microwave-resistant decorations on silicate tableware, the fluxing agent contains an organic silicon compound with three hydrolyzable groups at the silicon atom in a proportion of 0.1 to 2 moles of silicon per mole of precious metal.

7 Claims, No Drawings

GLOSSY, PRECIOUS-METAL PREPARATIONS FOR MICROWAVE-RESISTANT TABLEWARE-DECORATIONS

INTRODUCTION AND BACKGROUND

The present invention relates to glossy, precious-metal preparations for microwave-resistant tableware-decorations, where the tableware is formed of silicate base materials such as porcelain, ceramics, earthenwares or glass.

It is known that in conventional precious-metal decorations on tableware formed of porcelain, glass, earthenwares or ceramics, microwave radiation builds up so high an electrical potential that arc discharges are generated due to the potential difference between the layer of precious metal in the decoration and the cooking space of microwave oven whereby the decoration will be destroyed.

The German Patent No. 36 15 272 describes microwave-resistant tableware made of silicate base compositions and having precious-metal decorations, where the decorations are deposited not as a sheet layer but as screen elements no more than 5 mm in size and spaced apart from one another by at least 0.2 mm. However, such decorations suffer from the drawback that the human eye notices the screen effect and that accordingly no uniform, area decoration is possible.

The German Auslegeschrift No. 14 21 865 which has basis in U.S. Pat. No. 3,266,912, discloses glossy precious-metal preparations formed of an organic precious-metal compound, a soluble fluxing agent in the form of organic base-metal compounds, and an organic carrier. The fluxing agents are organo-metal compounds in the ratio of 0.3 to 3 moles of base metal per mole of precious metal. Such preparations are used to deposit films containing precious metals on glass-ceramic objects. However no information is provided about decorations that might be microwave-resistant.

SUMMARY OF THE INVENTION

An object of the present invention is to provide a glossy precious-metal preparation for microwave-resistant decorations on silicate type tableware.

In attaining the above and other objects, one feature of the invention resides in using glossy precious-metal preparations which comprise an organo-gold compound, optionally with organo-silver, organo-palladium or organo-platinum compounds or mixture thereof, an organic carrier and a fluxing agent composed of organic metal compounds and containing an organic silicon compound with three hydrolyzable groups at the silicon atom, and a proportion between 0.1 to 2 moles of silicon per mole of precious metal.

DETAILED DESCRIPTION OF THE INVENTION

In accordance with more detailed and preferred aspects of the invention there are provided precious-metal preparations for decorating tableware wherein the organic silicon compound is a compound of the general formula $Y_3SiX$, where $Y$ = alkoxy, aryloxy, aralkoxy, acyloxy, ketoximyl, mercaptan, halogen or pseudohalogen and, $X$ = alkyl, aryl, aralkyl, alkenyl, cycloalkenyl, vinyl or heteroatom-substituted analogues.

Organo-silicon compounds of the general formula $(ZO)_3\text{-}SiX$ were found advantageous for purposes of the invention, where $Z=R$, $R^1\text{—}OR$ or $R^2CO$ and where $R$ = linear or branched hydrocarbons with 1 to 24 C atoms, cycloaliphatic hydrocarbons with 3 to 8 C atoms, aromatic hydrocarbons with 6 to 10 C atoms or aliphatic-aromatic hydrocarbons with 7 to 15 C atoms.

$R^1$ = linear or branched hydrocarbons with 2 to 10 C atoms, and $R^2$ = linear or branched hydrocarbons with 1 to 10 C atoms.

Advantageously furthermore, an organic silicon compound of the general formula $(ZO)_3SiX$ can be used for purposes of the invention, wherein $X=R^2\text{—}Q$, where $Q$ = halogen, mercaptan, amine, urethane, amide, urea, azide, thiocyanate, isocyanate, epoxy, glycidyl or ester, and $R^2$ = linear or branched hydrocarbons with 1 to 10 C atoms.

Preferably $R^2=(CH_2)_n$, with $n=1,2,3$, and $Q$ = chlorine, bromine, iodine, isocyanate, aryloxy, methacryloxy, dimethylamine, glycidyl, mercaptan.

Surprisingly it was discovered that glossy precious-metal preparations containing these special organic silicon compounds as the fluxing component will provide surface area precious-metal decorations on silicate type substrates which are microwave-resistant in the conventional domestic microwave equipment and over the time intervals needed to heat foodstuffs.

Methods for making present commercial glossy precious-metal preparations may be used to make the decorations of the invention, and conventional deposition procedures may be employed. Temperatures of baking are conventional. All ingredients are conventional and known in this art. Illustratively the components of the preparations may be those of the German Auslegeschrift 14 21 865, which is based on U.S. Pat. No. 3,266,912, incorporated herein by reference.

The following examples illustrate a few precious-metal preparations resulting in microwave-resistant decorations on tableware.

1. A glossy precious-metal preparation of the following composition:

| | |
|---|---|
| gold sulforesinate (56% Au) | 17.9% weight |
| silver sulforesinate (20% Ag) | 5.0 |
| rhodium sulforesinate (5% in terpineol) | 1.0 |
| bismuth resinate (7% in terpineol) | 1.0 |
| chromium resinate (3% in terpineol) | 1.5 |
| bis[3-(triethoxysilyl)propyl] tetrasulfide | 13.4 |
| asphalt (50% in terpineol) | 25.0 |
| colophonium-modified phenolic resin | 15.0 |
| pine oil | 20.2 | is homogenized and tempered at 50° C. for 8 h. An area of 4.5×6 cm is printed by the decal method on hard porcelain. Following baking at 820° C., a glossy gold layer is obtained which can be exposed in a microwave range to electromagnetic radiation of 2.45 GHz/720 watt without incurring damage.

2. A glossy precious-metal preparation of the following composition:

| | |
|---|---|
| gold sulforesinate (56% Au) | 17.9% by weight |
| silver sulforesinate (20% Ag) | 5.0 |
| palladium sulforesinate (8% in terpineol) | 6.3 |
| rhodium sulforesinate (5% in terpineol) | 1.0 |
| bismuth resinate (7% in terpineol) | 1.0 |

| | |
|---|---|
| chromium resinate (3% in terpineol) | 1.5 |
| triethoxysilyl propylcarbamate | 11.4 |
| colophonium-modified phenolic resin | 20.0 |
| terpineol | 35.9 | is brush-deposited on hard porcelain and baked at 820° C. Again decoration is obtained which is microwave-resistant.

Further examples of especially well suited organic silicon compounds are:

3-methacryloxypropyl trimethoxysilane,
3-aminopropyl trimethoxysilane,
chloromethyl triethoxysilane
beta-(3,4-epoxycyclohexyl)ethyl trimethoxysilane
1,6-bis (trimethoxysilyl)ethane
bis [3-(triethoxysilyl)propyl] amine.

X=alkyl, aryl, aralkyl, alkenyl, cycloalkenyl, vinyl or heteroatom-substituted analogues, and Z is

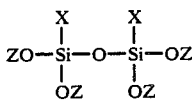

Substitution of any of the above mentioned organo-silicon compounds for the specific organo-silicon compounds identified in examples 1 and 2 will lead to comparable results.

Any organic carrier known in the art of precious-metal decorations can be used provided it is volatilizable and does not adversely effect the decoration. Likewise, any organo precious-metal compound such as the sulforesinates and any organo base metal compound such as base metal resinates can be used for purposes of the invention as will be apparent.

Further variations and modifications of the foregoing will be apparent to those skilled in the art and are intended to be encompassed in the appended claims.

We claim:

1. A glossy precious-metal preparation comprising at least one organo-gold compound, an organic carrier and a fluxing agent composed of at least one organic base-metal compound and containing an organic silicon compound with three hydrolyzable groups at the silicon atom, and a proportion between 0.1 and 2 moles of silicon per mole of precious metal in the preparation, which preparation is suitable for use as microwave-resistant decoration on tableware made of silicates, wherein the organic silicon compound has a formula selected from the group consisting of $Y_3SiX$, where
    Y=alkoxy, aryloxy, aralkoxy, acyloxy, ketoximyl, mercaptan, halogen or pseudohalogen, and
    X=alkyl, aryl, aralkyl, alkenyl, cycloalkenyl, vinyl or heteroatom-substituted analogues,
    $(ZO)_3SiX$, where $Z=R^1$—OR and where
    R=linear or branched hydrocarbons with 1 to 24 C atoms, cycloaliphatic hydrocarbons with 3 to 8 C atoms, aromatic hydrocarbons with 6 to 10 C atoms and aliphatic-aromatic hydrocarbons with 7 to 15 C atoms,
    $R^1$=linear or branched hydrocarbons with 2 to 10 C atoms,
    X=alkyl, aryl, aralkyl, alkenyl, cycloalkenyl, vinyl or heteroatom-substituted analogues,
    and $(ZO)_3SiX$, where $z=R$, $R^1$—OR or $R_2CO$ and where
    R=linear or branched hydrocarbons with 1 to 24 C atoms, cycloaliphatic hydrocarbons with 3 to 8 C atoms, aromatic hydrocarbons with 6 to 10 C atoms and aliphatic-aromatic hydrocarbons with 7 to 15 C atoms,
    $R^1$=linear or branched hydrocarbons with 2 to 10 C atoms, and
    $R^2$=linear or branched hydrocarbons with 1 to 10 C atoms,
    $X=R^2$—Q, with Q=halogen, mercaptan, amine, urethane, amide, urea, azide, thiocyanate, isocyanate, epoxy, glycidyl or ester, and
    $R^2$=linear or branched hydrocarbons with 1 to 10 C atoms.

2. The preparation of claim 1 which further contains an organo-silver, organo-palladium or organo-platinum compound, or mixtures thereof.

3. The preparation of claim 1, wherein the organic silicon compound is of the formula $Y_3SiX$, where
    Y=alkoxy, aryloxy, aralkoxy, acyloxy, ketoximyl, mercaptan, halogen or pseudohalogen, and
    X=alkyl, aryl, aralkyl, alkenyl, cycloalkenyl, vinyl or heteroatom-substituted analogues.

4. The preparation of claim 1 wherein the organic silicon compound had the formula $(ZO)_3SiX$, where $Z=R^1$—OR where
    R=linear or branched hydrocarbons with 1 to 24 C atoms, cycloaliphatic hydrocarbons with 3 to 8 C atoms, aromatic hydrocarbons with 6 to 10 C atoms and aliphatic-aromatic hydrocarbons with 7 to 15 C atoms
    $R^1$=linear or branched hydrocarbons with 2 to 10 C atoms, and
    X=alkyl, aryl, aralkyl, alkenyl, cycloalkenyl, vinyl or heteroatom-substituted analogues.

5. The preparation of claim 1 wherein an organic silicon compound of the general formula $(ZO)_3SiX$ is used, where $Z=R$, $R^1$—OR or $R^2CO$ and where
    R=linear or branched hydrocarbons with 1 to 24 C atoms, cycloaliphatic hydrocarbons with 3 to 8 C atoms, aromatic hydrocarbons with 6 to 10 C atoms and aliphatic-aromatic hydrocarbons with 7 to 15 C atoms,
    $R^1$=linear or branched hydrocarbons with 2 to 10 C atoms, and
    $R^2$=linear or branched hydrocarbons with 1 to 10 C atoms,
    $X=R^2$—Q, with Q=halogen, mercaptan, amine, urethane, amide, urea, azide, thiocyanate, isocyanate, epoxy, glycidyl or ester, and
    $R^2$=linear or branched hydrocarbons with 1 to 10 C atoms.

6. The preparation of claim 1 wherein the organic carrier includes terpineol.

7. The preparation of claim 1, wherein the silicon proportion is between 0.657 and 0.824 mole of silicon per mole of precious metal.

* * * * *